(12) United States Patent
Tan et al.

(10) Patent No.: US 9,064,145 B2
(45) Date of Patent: Jun. 23, 2015

(54) IDENTITY RECOGNITION BASED ON MULTIPLE FEATURE FUSION FOR AN EYE IMAGE

(75) Inventors: Tieniu Tan, Beijing (CN); Zhenan Sun, Beijing (CN); Xiaobo Zhang, Beijing (CN); Hui Zhang, Beijing (CN)

(73) Assignee: INSTITUTE OF AUTOMATION, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 13/519,728

(22) PCT Filed: Apr. 20, 2011

(86) PCT No.: PCT/CN2011/073072
§ 371 (c)(1),
(2), (4) Date: Sep. 30, 2013

(87) PCT Pub. No.: WO2012/142756
PCT Pub. Date: Oct. 26, 2012

(65) Prior Publication Data
US 2014/0037152 A1    Feb. 6, 2014

(51) Int. Cl.
G06K 9/00    (2006.01)
(52) U.S. Cl.
CPC ........ *G06K 9/00281* (2013.01); *G06K 9/00597* (2013.01); *G06K 9/00892* (2013.01)
(58) Field of Classification Search
USPC ......... 382/115, 117, 118, 278, 282; 340/5.52, 340/5.81, 5.82, 5.83
See application file for complete search history.

(56) References Cited

U.S. PATENT DOCUMENTS

| | | | |
|---|---|---|---|
| 7,176,973 B2 * | 2/2007 | Takada et al. | 348/335 |
| 7,278,028 B1 * | 10/2007 | Hingoranee | 713/186 |
| 7,742,623 B1 * | 6/2010 | Moon et al. | 382/103 |
| 7,797,549 B2 * | 9/2010 | Main et al. | 713/186 |

(Continued)

FOREIGN PATENT DOCUMENTS

CN    1932840 A    3/2007

OTHER PUBLICATIONS

Zhang, H. et al. 2007 "Drivers' eyes state recognition based on fuzzy fusion" *Journal of Computer Applications* 27(2):349-350.

*Primary Examiner* — Yosef Kassa
(74) *Attorney, Agent, or Firm* — Knobbe, Martens, Olson & Bear, LLP (57) ABSTRACT

A method for identity recognition based on multiple feature fusion for an eye image, which comprises steps of registering and recognizing, wherein the step of registering comprises: obtaining a normalized eye image and a normalized iris image, for a given registered eye image, and extracting a multimode feature of an eye image of a user to be registered, and storing the obtained multimode feature of the eye image as registration information in a registration database; and the step of recognizing comprises: obtaining a normalized eye image and a normalized iris image, for a given recognized eye image, extracting a multimode feature of an eye image of a user to be recognized, comparing the extracted multimode feature with the multimode feature stored in the database to obtain a matching score, and obtaining a fusion score by fusing matching scores at score level, and performing the multiple feature fusion identity recognition on the eye image by a classifier. The present invention recognizes identity by fusing multiple features of eye regions on a human face, and thus achieves high recognition accuracy and is suitable for applications of high security level.

21 Claims, 7 Drawing Sheets

(56) References Cited

U.S. PATENT DOCUMENTS

| | | |
|---|---|---|
| 8,125,546 B2 * | 2/2012 | Adams et al. .................. 348/273 |
| 8,219,438 B1 * | 7/2012 | Moon et al. .................. 705/7.29 |
| 8,274,592 B2 * | 9/2012 | Watkins et al. .......... 348/333.02 |
| 8,295,631 B2 * | 10/2012 | Adams et al. .................. 382/265 |
| 8,306,359 B2 * | 11/2012 | Kim et al. ..................... 382/282 |
| 8,374,404 B2 * | 2/2013 | Williams et al. .............. 382/117 |
| 8,885,882 B1 * | 11/2014 | Yin et al. ...................... 382/103 |

* cited by examiner

IDENTITY RECOGNITION BASED ON MULTIPLE FEATURE FUSION FOR AN EYE IMAGE

BACKGROUND OF THE INVENTION

1. Field of the Invention

The present invention relates to pattern recognition and statistics etc., more particularly to a method for multiple feature fusion personal identity recognition based on eye images.

2. Description of Prior Art

Personal identity feature is the basic information of a human being, which is very important. However, it is hard for a knowledge- and material-based identity recognition technology, such as password, secret code, and ID card, to fulfill the requirements of large-scale application and high level of security, and such technologies bring inconvenience to users. With the increasing development of intelligence- and information-based technologies in our society, a large-scale identify recognition technology has a great contribution on national security, public security, economic security and network security. Biometrics technology is a technology for identity recognition by using physical and behavior features of a human being, and has advantages such as high accuracy, high convenience for use, and high security. Widely used existing biometric modes include face recognition, iris recognition, voice recognition, fingerprint recognition, palm print recognition, signature, and gait recognition etc. Corresponding biometric systems are also successfully applied in various fields such as access control and network security etc.

Most of the existing biometric technologies require a well cooperation by the users. For example, most of fingerprint and palm print recognition devices are contact devices, while a non-contact device requires the user to corporate in a fixed manner. On one hand, inconvenience is introduced to the user, the system recognition rate is reduced, and the requirements of low response time and high flow volume in a large scale recognition scenario such as an air port, a customhouse, or a station etc.); on the other hand, the system can only operates in a passive recognition mode due to such well cooperation, in other words, the sensor can only receive data passively. However most of the security scenarios require an active recognition in which the sensor may obtain the information of the user with no or little corporation of the user. For example, it is desirable to authenticate the identity of a person in the monitor scenario in real time without any corporate of the user. Although some modes, such as face and gait, can be used in identity recognition without any cooperation of the user, the recognition accuracy of face recognition and gait recognition is not sufficient to fulfill the practical requirements.

Human eye region contains pupil, iris, eyelid, periocular skin, eyebrow, eyelash, and etc. Iris has been proved to be one of the most accurate biometric trait due to the high uniqueness of its texture. Iris recognition systems have also been applied in public places like bank, customs, airport, coal mine, as well for the social affairs like welfare distribution, missing children finding, and so on. In addition to iris texture, texture of periocular skin has good decidability and thus can be used for identity recognition. In addition, iris and eye skin region will render a color characteristic under visible light, and thus can be taken as assistant features. For example, in additional to appearance feature, the eye region has significant semantic features such as left/right eye, double/single-edged eyelid, profile of eyelid, and so on, which may also be classified. Therefore, the eye region becomes a biometric trait with the best decidability due to its various features.

Besides the high uniqueness, biometric trait based on eye region is also a biometric trait which is easy to be used and populated. Eye is a visual organ for human to sense the world, so that the eye region is generally exposed to the outside. Even when the face is shield, eye region is still uncovered. Therefore the eye region is easy to be captured by a visual sensor such as a camera. With the development of optical imaging technology, an active imaging system becomes possible. Related systems can acquire clear eye images from ten meters away or even more. In view of the above, identity recognition based on eye image can achieve a user-friendly man-machine interaction and active recognition functions.

Moreover, identity recognition based on eye region is very robust. A single modal biometric system is limited by application scenarios. For example, an iris texture suffering from disease is unable to be used in iris recognition. Because eye region contains multiple biometric trait modes such as iris texture and skin texture, the multimode biometric traits can be applied in various scenarios with few limitations.

In existing patents, a iris recognition system based on the uniqueness of iris is used for identity recognition by using eye region information, in which other features of the eye is not used. In addition, all the existing patents related to iris recognition achieve identity authentication by analyzing the local characteristic of iris texture feature of eye, such as the iris recognition algorithm proposed by Dr. John Daugman of University of Cambridge (U.S. Pat. No. 5,291,560), in which feature coding is performed by a Cabor filter; the method for iris recognition by analyzing shape feature of iris blobs proposed by Prof. Tieniu Tan et al. (CN 1684095). These methods are vulnerable to noise and rely on the accuracy of iris segmentation.

Sparse coding based iris recognition method in this patent is robust to the environmental noises, and does not ask for an additional noise detection based on image segmentation. Furthermore, in traditional score level fusion, the affections by the distribution of scores and the data noise is not considered, and thus the complementary characteristic between respective modes are not fully used.

SUMMARY OF THE INVENTION

Existing biometric recognition systems cannot simultaneously meet the needs of high accuracy, high usability and high robustness due to the intrinsic drawbacks of the biometric traits, which significantly impedes the widespread of biometric technology. This invention aims to realize a biometric recognition method with high accurate, less user cooperation and high applicability, based on the existing biometric traits and multimode fusion technology.

The present invention achieves identity recognition by extracting information of different modes in different feature characterizing manners and obtaining a plurality of matching scores in different matching manners, and obtaining a final fusion score via a robust score level fusion strategy.

To achieve above objects, this invention provides a method for identity recognition based on multiple feature fusion for an eye image, which comprises eye image preprocessing, multimode feature extraction, multimode feature matching, score level fusion and classification.

As described above, the method comprises steps of registering and recognizing, wherein the step of registering comprises:
  obtaining a normalized eye image and a normalized iris image, for a given registered eye image, and
  extracting a multimode feature of an eye image of a user to be registered, and storing the obtained multimode feature of the eye image as registration information in a registration database, wherein the multimode feature includes an iris texture feature, an iris color feature, an eye appearance feature, and an eye semantic feature; and the step of recognizing comprises:

obtaining a normalized eye image and a normalized iris image, for a given recognized eye image, extracting a multimode feature of an eye image of a user to be recognized, wherein the multimode feature includes an iris texture feature, an iris color feature, an eye appearance feature, and an eye semantic feature, comparing the extracted multimode feature with the multimode feature stored in the database to obtain a matching score, and obtaining a fusion score by fusing matching scores at score level, and performing the multiple feature fusion identity recognition on the eye image by a classifier.

In the present invention, identity is recognized by fusing various features in the eye region of the face of a human being, such that high system accuracy is achieved and the present invention is applicable in applications requiring a higher security level. The present invention reduces the cooperation of the user, and may be used as a long distance active identify recognition technology. The present invention is applicable to both an eye image under visible light and an eye image under other monochromatic light.

DETAILED DESCRIPTION OF THE PREFERRED EMBODIMENTS

The object, scheme, and advantages of the present invention will be apparent, from the following description of the present invention by means of its specific embodiments with reference to the drawings.

The method for identity recognition based on multiple feature fusion for an eye image comprises steps of registering and recognizing.

Figure 1A:
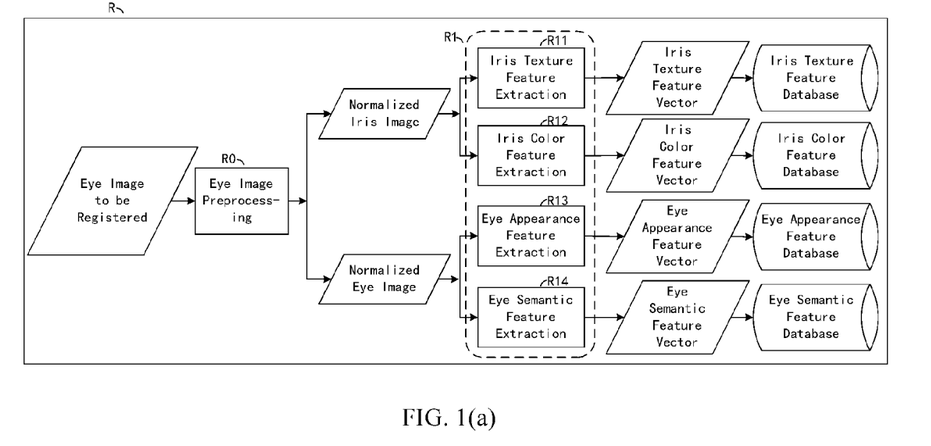
FIG. 1(a) shows a registering procedure of the method for identity recognition based on multiple feature fusion for an eye image.

Step of Registering R: As shown in FIG. 1(a), firstly the obtained eye image of a user to be registered is preprocessed (Step R0) to obtain a normalized eye image and a normalized iris image for feature extraction. Then a multimode feature of an image to be normalized is extracted by means of feature extraction, to obtain the registration information of the eye image and store it in a registration database. The Step of Registering R mainly comprises the following steps.

Step R0: The obtained eye image of a user to be registered is preprocessed to obtain a normalized eye image and a normalized iris image, in which the step of preprocessing comprises iris localization, iris normalization, eye region localization, and eye region normalization.

Step R11: After a grayscale normalized iris image of the eye image to be registered is down-sampled, an iris texture feature vector $V^r_{texture}$ is formed by arranging all the pixel values in line, and stored into an iris texture feature database.

Step R12: An iris color feature vector $V^r_{color}$ of a color normalized iris image of the eye image to be registered is extracted by means of color histogram, and stored into an iris color feature database.

Step R13: An eye appearance feature vector $V^r_{texton}$ of a color normalized eye image of the eye image to be registered is extracted by means of eye texton histogram, and stored into an eye appearance feature database.

Step R14: A eye semantic feature vector $V^r_{semantic}$ of the color normalized eye image of the eye image to be registered is extracted by differential filters and ordinal measuring, and stored into an eye semantic feature database.

Figure 1B:
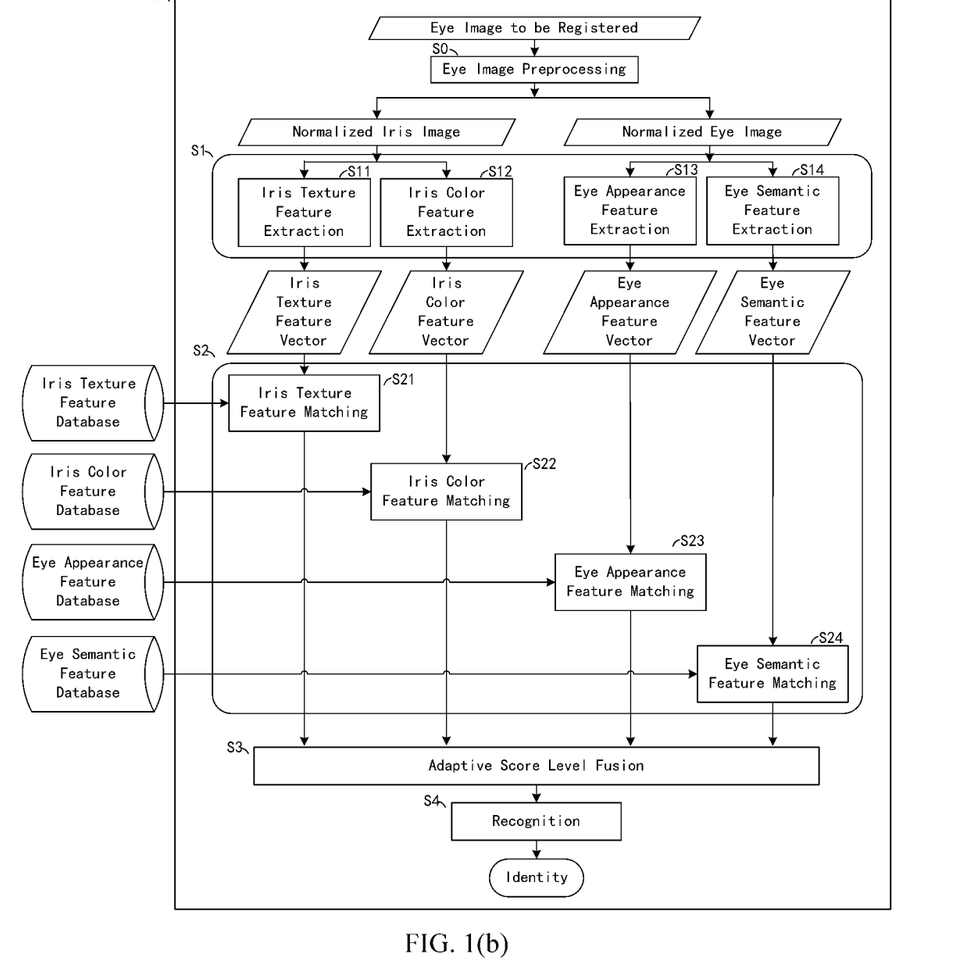
FIG. 1(b) shows a recognizing procedure of the method for identity recognition based on multiple feature fusion for an eye image.

Step of Recognition S: As shown in FIG. 1(b), firstly the obtained eye image of a user to be recognized is preprocessed to obtain a normalized eye image and a normalized iris image for feature extraction. Then a multimode feature is extracted by means of feature extraction. Then, the obtained feature is compared with the feature in the database by means of specific matching, to calculate a comparing score. A final matching score is obtained by fusing at score level. As shown in FIG. 1(b), the Step of Recognition S mainly comprises the following steps.

Step S0: The obtained eye image of a user to be recognized is preprocessed to obtain a normalized eye image and a normalized iris image, in which the step of preprocessing comprises iris localization, iris normalization, eye region localization, and eye region normalization.

Step S1: A multimode features of the eye images is extracted by following steps:

Step S11: An iris texture feature vector $V^s_{texture}$ of the normalized iris image to be recognized is extracted by means of sparse coding;

Step S12: An iris color feature vector $V^s_{color}$ of the normalized iris image to be recognized is extracted by means of color histogram;

Step S13: An eye appearance feature vector $V^s_{texton}$ of the normalized eye image to be recognized is extracted by means of eye texton histogram;

Step S14: An eye semantic feature vector $V^s_{semantic}$ of the normalized eye image to be recognized is extracted by differential filters and ordinal measure.

Step S2: Matching between multimode feature vectors is performed by following steps:

Step S21: A comparing score $S_{texture}$ is calculated as a reconstruction error between the iris texture feature vector $V^s_{texture}$ of the recognized image and the iris texture feature vector of each class of registered image in the database;

Step S22: A comparing score $S_{color}$ is calculated as the Euclidean distance distance between the iris color feature vector color $V^s{}_{color}$ of the recognized image and the iris color feature vector $V^r{}_{color}$ of the registered image in the database;

Step S23: A comparing score $S_{texton}$ is calculated as the Euclidean distance between the eye appearance feature vector $V^s{}_{texton}$ of the recognized image and the eye appearance feature vector $V^r{}_{texton}$ of the registered image in the database;

Step S24: A comparing score $S_{semantic}$ is calculated as the XOR distance between the eye semantic feature vector $V^s{}_{semantic}$ of the recognized image and the eye semantic feature vector $V^r{}_{semantic}$ of the registered image in the database.

Step S3: The multimode comparing scores are fused. A final comparing score $S'_f$ is obtained by adaptively fusing at score level.

Step S4: Classifying by a Nearest Neighborhood classifier.

The key steps related to the method of the present invention will be described in detail. Particularly, respective basic steps of the present invention are described as follows.

Preprocessing of Image

Figure 2A:
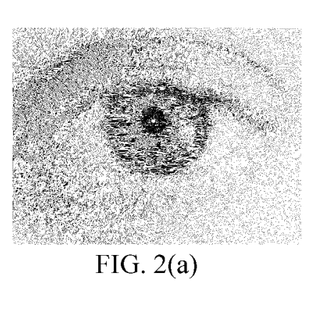
FIG. 2(a) shows a grayscale eye image.
Figure 2B:
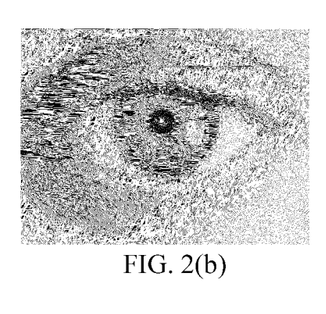
FIG. 2(b) shows a color eye image.
Figure 3:
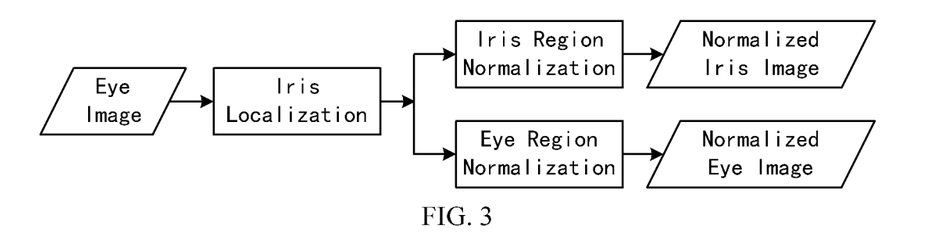
FIG. 3 shows an eye image preprocessing procedure of the method for identity recognition based on multiple feature fusion for an eye image.
Figure 4:
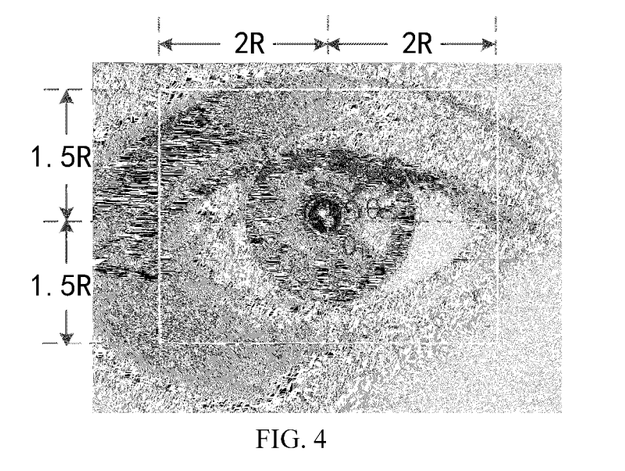
FIG. 4 shows the results of iris region localization and eye region localization for the eye image.

During either a registration process or a recognition process, it is necessary to apply iris localization (as shown in FIG. 4) to the captured original eye image (as shown in FIG. 2(b)) and then obtain a normalized eye image (as shown in FIG. 5) and a normalized iris image (as shown in FIG. 6) which may be used for feature extraction. As shown in FIG. 3, particular steps are described as follows.

Iris localization is performed. Two circles are used respectively to fit the internal and external boundaries of the iris in the captured original eye image (as shown in FIG. 2(b), a RGB image of a resolution of 640×480), i.e. the boundary between iris and pupil and the boundary between iris and sclera (the iris localization result image of the preprocessed original iris image as shown in FIG. 4). The iris localization may be implemented by the integral-differential operator as described in the U.S. Pat. No. 5,291,560, in which a iris localization result is obtained by applying integral-differential operation on the grayscale image (as shown in FIG. 2(a)). The integral-differential operator is expressed as follows:

$$\underset{(r,x_0,y_0)}{\mathrm{argmax}} \left| G_\sigma(r) * \frac{\partial}{\partial r} \oint_{(r,x_0,y_0)} \frac{I(x, y)}{2\pi r} ds \right|$$

where $G_\sigma(r)$ represents a Gaussian function with a variance $\sigma$. $I(x, y)$ represents the eye image, and $(r, x_0, y_0)$ represents parameters of a circle. Integral-differential operator is a circle boundary detector, the basic principle of which is to find a boundary defined along such parameters in the parameter space $(r, x_0, y_0)$ of the circle, perform a differential operation and then an integral operation, normalize the resulting values based on the perimeter of the circle to obtain an integral-differential energy value on such parameters, and use the parameter having a highest energy value in the parameter space as a final detected circle. In the iris image, the boundary between iris and pupil and the boundary between iris and sclera are both circle shaped, generally employ the two higher parameters among the integral-differential values, and are distinguished in accordance with the radius of the circles: the one with a smaller radius is considered as the localization result of the boundary between iris and pupil, and the one with a larger radius is considered as the localization result of the boundary between iris and sclera (as shown in FIG. 4, the iris localization results are denoted by two red circle regions).

Figure 5A:
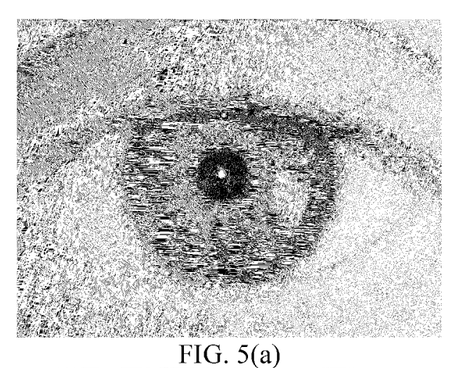
FIG. 5(a) shows a grayscale normalized eye image.
Figure 5B:
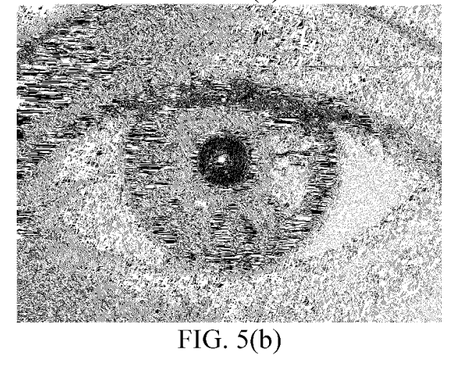
FIG. 5(b) shows a color normalized eye image.
Figure 6A:
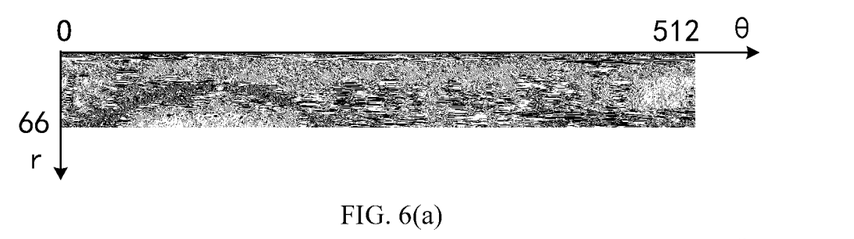
FIG. 6(a) shows a grayscale normalized iris image.
Figure 6B:
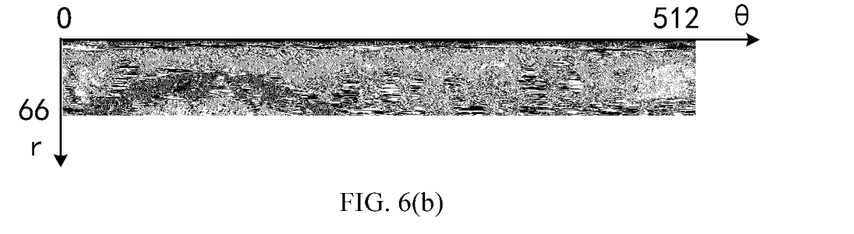
FIG. 6(b) shows a color normalized iris image.

Normalized iris image is obtained. The iris size varies between different iris images and the iris will enlarge or shrink as the variation of light. Therefore it is necessary to normalize the iris regions of different sizes before feature extraction. Since the internal and external boundaries of iris are obtained from iris localization, the iris normalization can be performed based on a "rubber sheet" model provided in U.S. Pat. No. 5,291,560. The basic principle is to normalize the circle iris region in the original image into a rectangular color normalized iris image of a fixed size (as shown in FIG. 6(b), a color RGB image of a resolution of 512×66) based on a transformation from Cartesian coordinate system to polar coordinate system, and perform an image mapping in a linear straight in manner. Sampling in angular direction is performed clockwise from zero degree in horizontal direction (as shown in FIG. 6(b), the direction indicated by the red arc arrow), and sampling in radial direction is performed from the boundary between iris and pupil (as shown in FIG. 6(b), the direction indicated by the red radial arrow). Then the red channel is chosen as the grayscale normalized iris image (as shown in FIG. 6(a), of a resolution of 512×66). Normalized eye image is obtained. The center of iris (as shown in FIG. 4) is determined in the captured original eye image (as shown in FIG. 1, a RGB image of a resolution of 640×480). A rectangular region of a fixed size (as shown in FIG. 4, the rectangular region having a center the same as the center of iris, a length four times larger than the radius of iris, and a width three times larger than the radius of iris) is defined as an eye region of interest, depending on a fixed center position of eye and the radius R of iris in the normalized image. The eye region of interest is mapped to a region of a fixed size in a bilinear manner, as the normalized eye image. A red channel of a color normalized eye region (as shown in FIG. 5(b), of a resolution of 200×150) is employed as a grayscale normalized eye image (as shown in FIG. 5(a), of a resolution of 200×150).

Extraction of Feature

After the normalized iris image and normalized eye image are obtained, extraction of feature is desired. Particular features as used herein include iris texture feature based on sparse coding, iris color feature based on color histogram, eye appearance feature based on SIFT texton histogram, and eye semantic feature based on differential filter and ordinal measurement. Particular steps of extraction are described as follows.

Iris texture feature is a basic feature of the iris.

High recognition rate is achieved, since a feature representation based on sparse coding is capable of overcome the influence by noise such as shielding in face recognition. Therefore the extraction of iris texture feature also uses sparse coding. The basic principle of sparse coding is that: all the samples of one class may be obtained by linear combining several samples of its own. Given m classes of iris with each class i comprises n registration samples. All the registration samples construct a group: X: $\{x_{11}, x_{12}, \ldots, x_{1n}, \ldots, x_{ij}, \ldots, x_{m1}, x_{m2}, \ldots, x_{mn}\}$. Given a sample y of the iris to be recognized, optimization is performed in accordance with $\alpha^* = \arg\min\|\alpha\|_1$ under a constraint condition $X\alpha = y$. The registration sample $x_{ij}$ is a iris texture feature vector $V^r{}_{texture}$ to be registered, and is composed of grayscale pixel values of a grayscale normalized iris image to be registered which is downsampled at a ratio of 0.25. The registration sample $x_{ij}$ has a size of 512×66/4=8448. y is a sample to be recognized, and is composed of grayscale pixel values of a grayscale normalized iris image to be recognized which is downsampled at a ratio of 0.25. y has a size of 8448. The optimization problem is solved to obtain a solution: $\alpha^*$: $\{\alpha^*_{11}, \alpha^*_{12}, \ldots, \alpha^*_{1n}, \ldots, \alpha^*_{ij}, \ldots, \alpha^*_{m1}, \alpha^*_{m2}, \ldots, \alpha^*_{mn}\}$ as the iris texture feature vector $V^s_{texture}$ for recognition, with the size of the solution being m×n.

Figure 7:
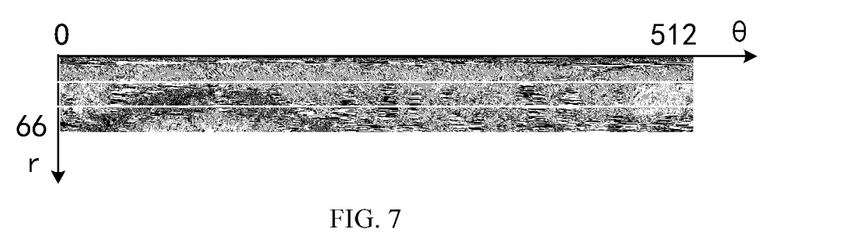
FIG. 7 shows a division of the color normalized iris image in extracting iris color feature.
Figure 8:
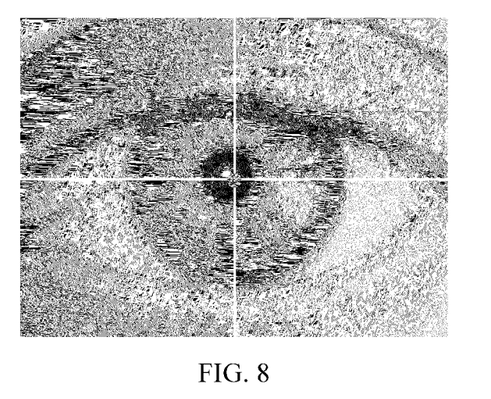
FIG. 8 shows a division of the color normalized eye image in extracting eye appearance feature.

Iris renders a color feature under visible light. Color histogram is commonly used to represent the color feature. The color feature has a local area characteristic, in which different regions under visible light have different color distributions. Accordingly, regional color histogram is more suitable to represent the color feature of iris. RGB color eye image is transformed into $l\alpha\beta$ color space, and the color feature of iris is extracted in $l\alpha\beta$ color space. For example, the color normalized iris image is divided into 3×1 blocks, i.e., is divided uniformly into 3 blocks along vertical direction (as shown in FIG. 7), in which each block is of a size of 22×512. The color histogram is constructed by calculating the frequency at which each color value occurs on each of the three channels 1, $\alpha$, $\beta$, in which the size of the color space of each channel is 256. Finally, all the 9 color histograms of 3 channels and 3 blocks are concatenated into a color histogram, as an iris color feature vector $V^s_{color}$ having a dimension of 256×3×9=6912. The transformation from RGB space to $l\alpha\beta$ space is as follows:

$$\begin{bmatrix} L \\ M \\ S \end{bmatrix} = \begin{bmatrix} 0.3811 & 0.5783 & 0.0402 \\ 0.0606 & 0.3804 & 0.0453 \\ 0.0241 & 0.1228 & 0.8444 \end{bmatrix} \begin{bmatrix} R \\ G \\ B \end{bmatrix}$$

$$\begin{bmatrix} l \\ \alpha \\ \beta \end{bmatrix} = \begin{bmatrix} \frac{1}{\sqrt{3}} & 0 & 0 \\ 0 & \frac{1}{\sqrt{6}} & 0 \\ 0 & 0 & \frac{1}{\sqrt{2}} \end{bmatrix} \begin{bmatrix} 1 & 1 & 1 \\ 1 & 1 & -2 \\ 1 & -1 & 0 \end{bmatrix} \begin{bmatrix} \log L \\ \log M \\ \log S \end{bmatrix}$$

Figure 10A:
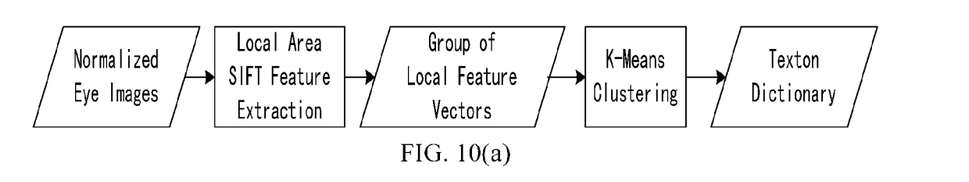
FIG. 10(a) shows a training procedure of texton.
Figure 10B:
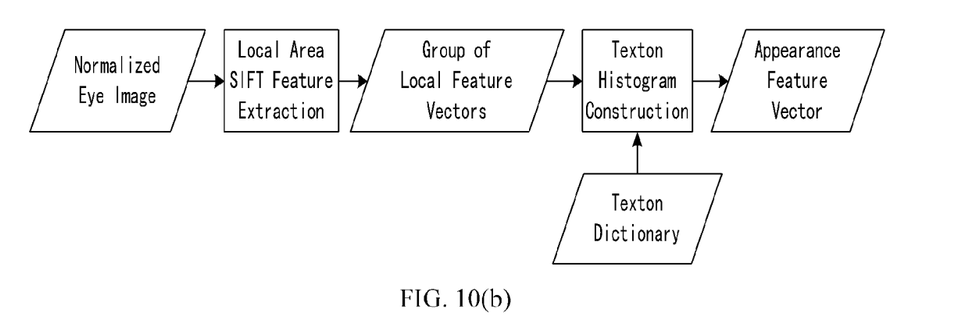
FIG. 10(b) shows a construction procedure of texton histrogram.

In additional to the iris features, the appearance feature of the entire eye region also has a certain distinction. The eye texture and skin texture are used as an uniform eye appearance feature in identity recognition. Texton histogram is an effective texture analysing approach, whose basic principle is that: a texture pattern is composed of basic elements (textons), and the pattern varies with the distribution of the basic elements. FIG. 10(a) shows the procedure of texton acquisition. Firstly, a feature vector of each pixel on each channel of all the normalized color eye image used for training is extracted by using an SIFT local descriptor, with the dimension of the feature vector is 128. The all of the obtained local feature vectors are clustered into K groups via K-means clustering, with the center of each group taken as texton, and all the textons construct a texton dictionary. Moreover, three dictionaries are constructed for R, G, B channels. FIG. 10(a) shows the procedure of appearance feature extraction of eye region. Each color normalized eye image is uniformly divided into 2×2=4 blocks, and then SIFT local feature vector is extracted on each pile of each color channel within each block. After that, each local feature vector is quantized into a texton having a minimum distance (generally Euclidean distance) from the local feature vector. The frequency at which each texton occurs is calculated to construct a texton histogram for this region on each channel. Finally, all the texton histograms (3 channels×4=12) are concatenated into the eye appearance feature vector $V^s_{texton}$ of a size of k×12. The calculation procedure of SIFT can be found in U.S. Pat. No. 6,711,293.

Figure 11:
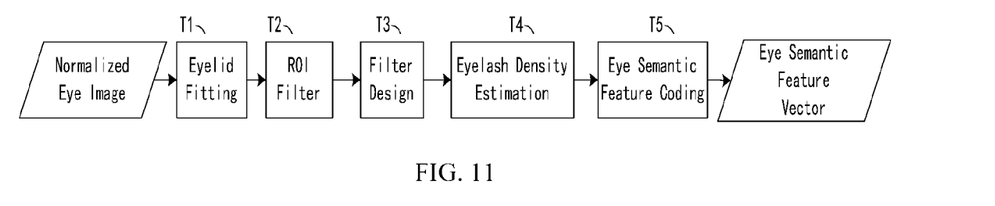
FIG. 11 shows an extraction procedure of eye semantic feature.

A label of left or right eye is used to mark the eye semantic feature. 0/1 is used to mark left/right eye. In particular, the left/right eye is marked in accordance with the difference between the distribution of the eyelashes on the left side of the upper eyelid and the distribution of the eyelashes on the right side of the upper eyelid. The eyes are marked with numbers by comparing the eyelash density of a part near the outer canthus and the eyelash density of a part away from the tear duct. Given the color normalized eye image, the extraction procedure of eye semantic feature is shown in FIG. 11 comprising eyelid fitting, selection of the region of interest (ROI), filter design, eyelash density estimation, and semantic feature encoding.

Figure 9:
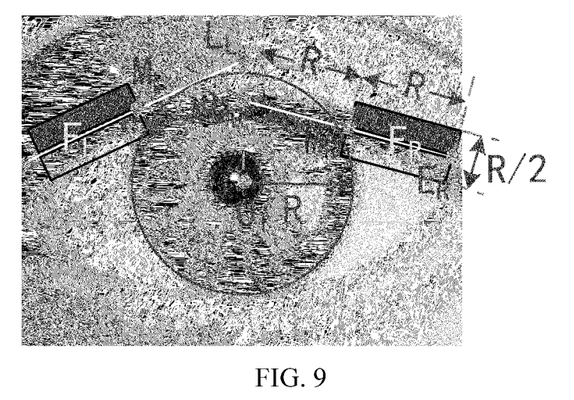
FIG. 9 shows a selection of the regions of interest and a configuration of the differential filters in extracting eye semantic feature.

Eyelid fitting: Firstly, boundary information is obtained by using a Canny boundary detector in a grayscale normalized eye image. Then based on the result of iris localization, boundary points of the upper-left and upper-right regions of the outer circle of iris are sleeted to be straight line fitted, to obtain a coarse fitting of the upper eyelid (as shown in FIG. 9 by the white lines).

Selection of the region of interest: Based on the result of eye fitting, a ROI is selected. As shown in FIG. 9, the black rectangle boxes represent the selected ROIs. Selection of the right ROI is taken as an example. $O_I$ is the center of outer boundary of iris region, and R is the radius. $L_R$ is an intersection point of the diameter $L_R O_I$ in vertical direction and the right line eyelid fitting straight line $L_R E_R$. The length of $L_R E_R$ is R, and $M_R$ is the center of $L_R E_R$. The black box labels the selected ROI with a width R and a height R/2. The long side is parallel to $L_R E_R$. Selection of the left ROI is achieved in a similar manner.

Filter design: A left and right differential filters are designed for left and right ROIs respectively. Take the right filter as an example. The right filter has the same size and direction as those of the right ROI. As shown in FIG. 9, all the red regions are set to 1, and the blank portion is set to −1. The directions of the differential filters are vertical to the straight line on the right side of the eyelid, to achieve adaptive direction. The length of the filters are set to have a length of R and a width of R/2 in accordance with the radius of the iris, to achieve adaptive size, in which R represents the radius of the circle obtained by fitting the external boundary of iris. The left filter is designed similarly.

Eyelash Density Estimation: Taking the right side as an example, the eyelash density of ROI is estimated in the color normalized eye image. Convolution is achieved by using the right filter and the right ROI region on each of the color channels respectively, to obtain a response on each channel. The resulting responses on R, G, B channels are summed to obtain a final result as the eyelash density estimation DR of the right ROI. The eyelash density estimation DL of the right ROI is calculated similarly.

Semantic Feature Encoding: An eye semantic feature vector $V^s_{semantic}$ is generated by ordinal measuring. If $D_L > D_R$, $V^s_{semantic} = 1$, otherwise, $V^s_{semantic} = 0$.

Matching Strategy:

In recognition, matching between the feature vector to be recognized and the registered feature vector is desired. Based on the above described 4 types of features, matching of the iris semantic feature is implemented based on logical XOR distance, i.e. $S_{semantic} = \text{XOR}(V^s_{semantic}, V^r_{semantic})$. The iris color feature and the eye appearance feature are implement based on Euclidean distance as follows:

$$S = d(v_1, v_2) = \|v_1 - v_2\|_2$$

For the iris texture feature, given a sample y for recognition and a registration sample feature vector x: $\{x_{11}, x_{12}, \ldots, x_{1n}, \ldots, x_{ij}, \ldots, s_{m1}, x_{m2}, \ldots, x_{mn}\}$, the iris texture feature vector $V^s_{texture}$ for recognition is obtained by sparse coding, i.e. $\alpha^*$: $\{\alpha^*_{11}, \alpha^*_{12}, \ldots, \alpha^*_{1n}, \ldots, \alpha^*_{ij}, \ldots, \alpha^*_{m1}, \alpha^*_{m2}, \ldots, \alpha^*_{mn}\}$. The reconstructed recognition sample y* is obtained by using a reconstruction coefficient $\alpha^*_i$: $\{\alpha^*_{i1}, \alpha^*_{i2}, \ldots, \alpha^*_{in}\}$ of each class and a sample $X_i$: $\{x_{i1}, x_{i2}, \ldots, x_{in}\}$, and the matching scores between the sample and all the samples of each class are recognized as a reconstruction error as following:

$$S_i = \|y - y_i^*\|_2, y^* = \alpha^*_i X_i$$

It will be noted that, the smaller the values of the above four types of comparing scores are, the smaller the difference between the registration feature and the recognition feature is.

After the matching scores for the four types of features, i.e. $S_{texture}$, $S_{color}$, $S_{texton}$, $S_{semantic}$ a final comparing score is obtained by a score-level adaptive fusion strategy. The adaptive score-level-fusion strategy comprises: score normalizing, weighted summing, and adaptive adjusting.

Score normalizing: Before score fusing, it is desirable to normalize the original four types of comparing scores into the same range [0, 1]. The smaller the value of the comparing score is, the smaller the difference between the registration feature and the recognition feature is. There are many methods of score normalizing in documents, in which the "min-max" normalizing method is the simplest and effective one. Given a set of matching scores S: $\{s_1, s_2, \ldots, s_n\}$, the "min-max" normalizing is implemented as follows:

$$s'_i = \frac{s_i - \min(S)}{\max(S) - \min(S)}$$

The original four matching scores are normalized to obtained four normalized scores $S'_{texture}$, $S'_{color}$, $S'_{texton}$, $S'_{semantic}$.

After normalizing, score level fusion is performed by a weighted summing strategy, to obtain a fusion comparing score as follows:

$$S_f = w_1 S'_{texture} + w_2 S'_{color} + w_3 S'_{texton},$$

where $w_i$ is the weight, (i=1, 2, 3, $w_1+w_2+w_3=1$). Generally $w_i$ has the same value, meaning that each feature has the same weightiness.

To eliminate the influence of noise, the fusion comparing score may be revised in accordance with the eye semantic feature matching score, to obtain a revised fusion score $S'_f$. The rules for revising is as follows:

if $S'_{semantic}=1$ and $S_f < M_1, S'_f = M_1$ if $S'_{semantic}=0$ and $S_f > M_2, S'_f = M_2, M_1 > M_2$ The first rule means that: if the semantic feature of the recognition eye image is different from that of the registration eye image and the fusion result is that the recognition eye image is similar to the registration eye image, the original fusion score is enlarged to $M_1$, trending to make the recognition eye image not similar to the registration eye image. The second rule means that: if the semantic feature of the recognition eye image is different from that of the registration eye image and the fusion results of the other three types of features shows that the recognition eye image is not similar to the registration eye image, the original fusion score is reduced to $M_2$, trending to make the recognition eye image not similar to the registration eye image.

The classifier of the present invention is a Nearest Neighborhood classifier, namely the class of identity with the smallest matching score is the final recognized identity.

Embodiment 1

Application of the Method for Identity Recognition Based on Multiple Feature Fusion for an Eye Image in a Network Transaction Platform The present invention may be widely applied in identity recognition in a network platform based on a network camera. As the development of electronic commerce, transaction on network platform is introduced into our social life. At the same time, cheat accompanies. The security level of traditional identity recognition modes based on secret code and password is unlikely to fulfill practical requirements. Biometrics technology becomes an effective solution. Identity recognition based on eye image has great contributions. When a user is registering, eye region information is transmitted to a third party authentication center by a normal network camera. The remote authentication center will register the biometric trait of the user into a system database by using the registration algorithm of the present invention. When the user is performing a network platform identity authentication, the network camera will transmit the captured eye region information to the third party authentication center. The remote authentication center will refer to the system database by using the recognition algorithm of the present invention, to perform identity authentication. Such method may achieve a convenient and effective identity authentication, and thus ensure the security of the personal identity information on the network platform.

Embodiment 2

Application of the Method for Identity Recognition Based on Multiple Feature Fusion for an Eye Image in a Security Monitor Scenario The present invention may be widely applied in a security monitor scenario. In the security monitor scenario, it is desirable to monitor the people occurring in the scenario, such that alarming will be triggered in good time when illegal people occurs. For example, eye region information of a criminal who has been arrested is registered in the system database, to prevent him from committing a crime in the future. When a criminal occurs in the capture range of the network monitor camera, his/her eye region information will be transmitted to a processing terminal via network, and the processing terminal will determine his/her identity by using the recognition algorithm of the present invention. If he/she is determined to be a criminal, alarming will be triggered in good time so as to arrest the criminal.

Although illustrative embodiments have been described herein in detail, the scope of the present invention is not limited thereto. Those skilled in the art will appreciate that variations and substitution may be made without departing from the spirit and scope of this invention. Therefore the scope of the present invention is defined by the claims.

What is claimed is:

1. A method for identity recognition based on multiple feature fusion for an eye image, which comprises steps of registering and recognizing, wherein:
   the step of registering comprises:
      obtaining a normalized eye image and a normalized iris image, for a given registered eye image, and extracting a multimode feature of an eye image of a user to be registered, and storing the obtained multimode feature of the eye image as registration information in a registration database; and the step of recognizing comprises:
obtaining a normalized eye image and a normalized iris image, for a given recognized eye image,
extracting a multimode feature of an eye image of a user to be recognized,
comparing the extracted multimode feature with the multimode feature stored in the database to obtain a matching score, and obtaining a fusion score by fusing matching scores at score level, and
performing the multiple feature fusion identity recognition on the eye image by a classifier,
wherein the multimode feature includes an iris texture feature, an iris color feature, an eye appearance feature and an eye semantic feature.

2. The method according to claim 1, further comprising image preprocessing, which comprises iris image preprocessing and eye image preprocessing.

3. The method according to claim 2, wherein iris image preprocessing includes iris localization and iris image normalization.

4. The method according to claim 3, wherein iris localization is implemented by double-circle fitting, in which two circles are used to fit the boundary between iris and pupil and the boundary between iris and sclera respectively.

5. The method according to claim 3, wherein the iris image normalization comprises:
mapping the original circle iris region into a rectangular region of a fixed size by transforming from a Cartesian coordinate system to a polar coordinate system.

6. The method according to claim 2, wherein eye image preprocessing includes eye region localization and eye region normalization.

7. The method according to claim 6, wherein eye region localization comprises:
labeling eye region as a rectangular region having a center identical to the center of a circle which is obtained by fitting the boundary between iris and sclera.

8. The method according to claim 6, wherein eye image normalization comprises:
scaling the original eye region into a rectangular region of a fixed size.

9. The method according to claim 1, wherein the iris texture feature is extracted by sparse coding.

10. The method according to claim 1, wherein the iris color feature is extracted by a color histogram.

11. The method according to claim 1, wherein the eye appearance feature is extracted by texton representation.

12. The method according to claim 1, wherein the eye semantic feature is extracted by a differential filter and an ordinal measuring characteristic.

13. The method according to claim 10, wherein the iris color feature vector is obtained by extracting a color histogram on each of color channels of each block of image and concatenating all the color histograms.

14. The method according to claim 10, wherein color histogram is extracted in $1\alpha\beta$ color space.

15. The method according to claim 11, wherein extracting the eye appearance feature by a texton histogram comprises:
extracting a local feature for each pixel of each image via scale invariant feature transformation;
constructing a texton dictionary by K textons which are obtained via K-means clustering;
constructing texton histograms, by dividing the normalized eye image into non-overlap blocks and calculating the frequency at which each texton occurs in accordance with the matching degree between a local descriptor and the texton for each block; and
concatenating the texton histograms of all the block regions to form the eye appearance feature vector.

16. The method according to claim 15, wherein if each divided image is a color image, the frequency at which each texton occurs is calculated on each color channel.

17. The method according to claim 12, wherein the extracting the eye semantic feature comprises:
obtaining a coarse position of an eyelash region of an upper eyelid in accordance with a result of iris localization and eyelid localization;
choosing a left part and a right part of the eyelash region of upper eyelid as regions of interest, based on the position of eyelash region of upper eyelid and iris region;
generating left and right differential filters having adaptive sizes and directions based on the radius of iris and the direction information of upper eyelid;
obtaining an estimation of the density of the left region of interest by convoluting the left differential filter and the left region of interest, and obtaining an estimation of the density of the right region of interest by convoluting the right differential filter and the right region of interest;
generating the eye semantic feature vector in accordance with an ordinal measuring characteristic based on the estimations of the densities of the left and right regions of interest.

18. The method according to claim 17, wherein the adaptive differential filters are configured such that the upper eyelid is fitted by left and right straight lines, the directions of the left and right differential filters are perpendicular to the left and right straight lines respectively to achieve adaptive direction, and a length and a width of each filter are set depending on the radius of the iris to achieve adaptive size.

19. The method according to claim 17, wherein if the eye image is a color eye image, the regions of interest of the eye image on the R, G, B channels are convoluted by the filters, and the convolution values on all the channels are summed to obtain a final response value for the filters and the regions of interest of the color eye image.

20. The method according to claim 1, wherein fusing at score level comprises:
normalizing the matching score $S_{color}$ of the iris color feature, the matching score $S_{texture}$ of the iris texture feature, and the matching score $S_{texton}$ of the eye appearance feature in accordance with the distributions of their original scores respectively, to obtain normalized scores $S'_{color}$, $S'_{texture}$, $S'_{texton}$;
weighted summing the normalized scores $S'_{color}$; $S'_{texture}$; $S'_{texton}$ to obtain the fusion score $S_f = w_1 S'_{texture} + w_2 S'_{color} + w_3 S'_{texton}$;
revising the fusion score $S_f$ obtained by weighted summing, based on the comparison result $S'_{semantic}$ of the eye semantic feature, to obtain $S'_f$, where $w_i$ represents the weight, (i=1, 2, 3, $w_1+w_2+w_3=1$).

21. The method according to claim 20, wherein the revising follows a rule resulting from the trending of the fusion score and the eye semantic feature, in which if the eye semantic feature is similar while the other features are not similar, then the fusion score is revised such that the eye semantic feature is changed to be more similar; if the eye semantic feature is not similar while the other features are similar, then the fusion score is revised such that the eye semantic feature is changed to be less similar.

* * * * *